UNITED STATES PATENT OFFICE.

ALGERNON K. JOHNSTON AND LORENZO DOW, OF NEW YORK, N. Y.

IMPROVEMENT IN RENDERING CARTRIDGES WATER-PROOF.

Specification forming part of Letters Patent No. 35,687, dated June 24, 1862.

*To all whom it may concern:*

Be it known that we, ALGERNON K. JOHNSTON and LORENZO DOW, of the city, county, and State of New York, have invented a new and improved method of rendering the envelopes of cartridges water-proof without impairing their combustibility, of which the following is a specification.

This method was mentioned by us in the specification accompanying the Letters Patent granted to us for an improved cartridge on the 1st of October, 1861; but we did not therein apply for a patent for this invention, preferring to secure therefor, after further experiment, distinct and separate Letters Patent.

This our invention is applicable to the envelopes of all cartridges for fire-arms, of whatever tissue or material the same may be formed, embracing as well all cartridges for the use of artillery, of every description, and for mining and blasting purposes, made with an envelope.

In order to accomplish our object of procuring a substance that should render the envelope of a cartridge water-proof and at the same time not injure its combustibility, we have made use of most of those substances which are formed by the action of nitric acid alone, or in combination with sulphuric acid, or by the action of any nitrate alone or in combination with sulphuric acid on vegetable matter, as cotton, flax, &c., or on the product of vegetable matter, as sugar, &c., always dissolving the substance so formed in its proper solvent, which is generally alcohol or ether, or a combination of these two liquids. The solutions thus made have answered our purpose very well, especially that formed by gun-cottonizing old linen and afterward dissolving it in a mixture of alcohol and ether. The cheapest article we have found, and almost equally good with that last mentioned, is collodion made from very fine long-staple cotton in the ordinary way; and, all things considered, we prefer to make use of this article in waterproofing a cartridge.

The application of the collodion, or other substance prepared as above, is made to the envelope or covering of the cartridge by coating the same with it, by dipping or otherwise. We have found the best plan in practice to be to dip the cartridge in collodion after the envelope is fastened to it, which gives a uniform coating to the whole covering. The dipping should be repeated until the coating is of the desired thickness.

We have also made use of collodion in connection and in combination with a combustible material for the same purpose—as, for instance, in combination with the salts furnishing oxygen, or with some preparation or solution of such salt; also, with materials furnishing hydrogen, since hydrogen enters largely into the composition of highly-inflammable substances. Among the salts, we have used the chlorate and the nitrate of potash, and among hydrocarbons we have used petroleum, paraffine, and turpentine.

We do not claim to have invented or discovered the use of any of the substances or solutions above described in connection with a cartridge, except in so far as their application is concerned with the envelope or covering of the cartridge, for the purpose above mentioned; but We do claim as our invention—

The application of the said substances and solutions, or any of them, to the envelope of a cartridge, for the purpose of waterproofing the same, substantially as above described.

ALGERNON K. JOHNSTON
LORENZO DOW.

Witnesses:
JULIUS R. POMEROY,
DANIEL POMEROY.